(12) United States Patent
Ishibashi et al.

(10) Patent No.: US 11,401,211 B2
(45) Date of Patent: Aug. 2, 2022

(54) METHOD FOR MANUFACTURING GAS ADSORPTION UNIT, METHOD FOR MANUFACTURING GLASS PANEL UNIT AND METHOD FOR MANUFACTURING BUILDING COMPONENT

(71) Applicant: PANASONIC INTELLECTUAL PROPERTY MANAGEMENT CO., LTD., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Masataka Nonaka, Osaka (JP); Takeshi Shimizu, Toyama (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 16/622,211

(22) PCT Filed: Jun. 19, 2018

(86) PCT No.: PCT/JP2018/023214
§ 371 (c)(1),
(2) Date: Dec. 12, 2019

(87) PCT Pub. No.: WO2019/003997
PCT Pub. Date: Jan. 3, 2019

(65) Prior Publication Data
US 2020/0181013 A1  Jun. 11, 2020

(30) Foreign Application Priority Data

Jun. 30, 2017  (JP) .............................. JP2017-129894

(51) Int. Cl.
*C03C 27/06* (2006.01)
*E06B 3/24* (2006.01)
*E06B 3/66* (2006.01)

(52) U.S. Cl.
CPC ................ *C03C 27/06* (2013.01); *E06B 3/24* (2013.01); *E06B 3/66* (2013.01)

(58) Field of Classification Search
CPC ...... E06B 3/673; E06B 3/67317; E06B 3/677; E06B 3/6775; E06B 3/6612; E06B 3/24;
(Continued)

(56) References Cited

U.S. PATENT DOCUMENTS 3,260,356 A * 7/1966 Garbe ...................... H01J 7/18
                                                              417/48
5,191,980 A   3/1993 Boffito et al.
(Continued)

FOREIGN PATENT DOCUMENTS

CN    1621653 A     6/2005
JP    H05-254588 A  10/1993
(Continued)

OTHER PUBLICATIONS

International Search Report and Written Opinion issued in International Patent Application No. PCT/JP2018/023214, dated Aug. 28, 2018; with partial English translation.

*Primary Examiner* — Travis M Figg
(74) *Attorney, Agent, or Firm* — McDermott Will & Emery LLP

(57) ABSTRACT

The method for manufacturing the gas adsorption unit includes a preparation step, an activation step, and a sealing step. The preparation step is a step of wrapping a getter with a package material. The activation step is a step of heating the getter wrapped with the package material to activate the getter. The sealing step is a step of melting the package (Continued)

material by heating the package material so as to seal, with the package material, the getter activated in the activation step.

15 Claims, 17 Drawing Sheets

(58) Field of Classification Search
CPC .... E06B 3/66; C03C 27/06; H01J 7/00; H01J 7/18; H01J 29/94; H01J 7/183; H01J 7/186; B01J 20/183; B01J 20/3484; B01B 7/0038; B01D 53/005
See application file for complete search history.

(56) References Cited

U.S. PATENT DOCUMENTS

| | | | |
|---|---|---|---|
| 6,420,002 B1 | 7/2002 | Aggas et al. | |
| 8,002,602 B2 * | 8/2011 | Miura | H01J 9/261 |
| | | | 445/25 |
| 2018/0320436 A1 | 11/2018 | Abe et al. | |

FOREIGN PATENT DOCUMENTS

| | | |
|---|---|---|
| JP | 2010-227920 A | 10/2010 |
| JP | 2016-108799 A | 6/2016 |
| WO | 2017/056422 A1 | 4/2017 |

* cited by examiner

METHOD FOR MANUFACTURING GAS ADSORPTION UNIT, METHOD FOR MANUFACTURING GLASS PANEL UNIT AND METHOD FOR MANUFACTURING BUILDING COMPONENT

CROSS-REFERENCE OF RELATED APPLICATIONS

This application is the U.S. National Phase under 35 U.S.C. § 371 of International Patent Application No. PCT/JP2018/023214, filed on Jun. 19, 2018, which in turn claims the benefit of Japanese Application No. 2017-129894, filed on Jun. 30, 2017, the entire disclosures of which Applications are incorporated by reference herein.

TECHNICAL FIELD

The present disclosure relates to a method for manufacturing a gas adsorption unit, a method for manufacturing a glass panel unit, and a method for manufacturing a building component.

BACKGROUND ART

Patent Literature 1 discloses a manufacturing method of a glass panel unit including a pair of glass panels with a vacuum space formed therebetween. This manufacturing method includes disposing a first plate glass and a second plate glass to face each other with a frame body provided therebetween, and then heating the frame body to melt the frame body so as to hermetically bond the first plate glass and the second plate glass to each other. Next, an internal space formed between the first plate glass and the second plate glass is evacuated to become a vacuum space. Then, the vacuum space is hermetically closed to obtain an assembly. Then, part of this assembly is cut out to obtain a glass panel unit.

A gas adsorbent for adsorbing gas discharged from the frame body or the like is disposed in the vacuum space of the glass panel unit. The gas adsorbent contains a getter which is zeolite. The getter is activated by being heated when the internal space is evacuated in the manufacturing method, and thus, the gas discharged from the frame body or the like is adsorbed onto the getter.

Incidentally, in order to adsorb the gas, the gas adsorbent has to be heated to a temperature equal to or higher than an activation temperature of the getter so that the getter is activated. For this reason, use of the gas adsorbent is likely to be limited, for example, when the gas adsorbent cannot be heated to a high temperature.

CITATION LIST

Patent Literature

Patent Literature 1: JP 2016-108799 A

SUMMARY OF INVENTION

The present disclosure has been made in view of the foregoing, and an object thereof is to provide a method for manufacturing a gas adsorption unit, wherein the method enables a gas adsorption unit usable without performing an activation step on a getter to be easily manufactured. It is another object of the present disclosure to provide: a method for manufacturing a glass panel unit including the gas adsorption unit; and a method for manufacturing a building component including the glass panel unit.

In order to achieve the object, a method for manufacturing a gas adsorption unit according to the present disclosure includes a preparation step, an activation step, and a sealing step. The preparation step is a step of wrapping a getter with a package material. The activation step is a step of heating the getter wrapped with the package material to activate the getter. The sealing step is a step of melting the package material by heating the package material so as to seal, with the package material, the getter activated in the activation step.

A method for manufacturing a glass panel unit according to the present disclosure includes a disposition step, a bonding step, an evacuation and hermetically closing step, and an unsealing step. The disposition step is a step of disposing a first substrate and a second substrate to face each other with a sealing material provided between the first substrate and the second substrate to form an internal space. The first substrate includes a glass panel. The second substrate includes a glass panel. The sealing material has a frame shape. The internal space is surrounded by the first substrate, the second substrate, and the sealing material. The bonding step is a step of heating a glass composite including the first substrate, the second substrate, and the sealing material to melt the sealing material such that the sealing material hermetically bonds the first substrate and the second substrate to each other. The evacuation and hermetically closing step is a step of evacuating and then sealing the internal space. In the disposition step, the gas adsorption unit is disposed to be located in an area surrounded by the sealing material having the frame shape. The gas adsorption unit includes a package and the getter. The package is formed of the package material. In the unsealing step, thermal stress is caused at the package after the evacuation and hermetically closing step to break the package by the thermal stress so as to remove sealing of the getter with the package.

A method for manufacturing a building component according to one aspect of the present disclosure includes a fitting step. The fitting step is a step of fitting a building component frame to the glass panel unit manufactured by the method for manufacturing the glass panel unit.

DESCRIPTION OF EMBODIMENTS

The embodiments shown below relate to a method for manufacturing a gas adsorption unit including a getter, a method for manufacturing a glass panel unit including the gas adsorption unit, and a method for manufacturing a building component including the glass panel unit.

(Gas Adsorption Unit)

Figure 1:
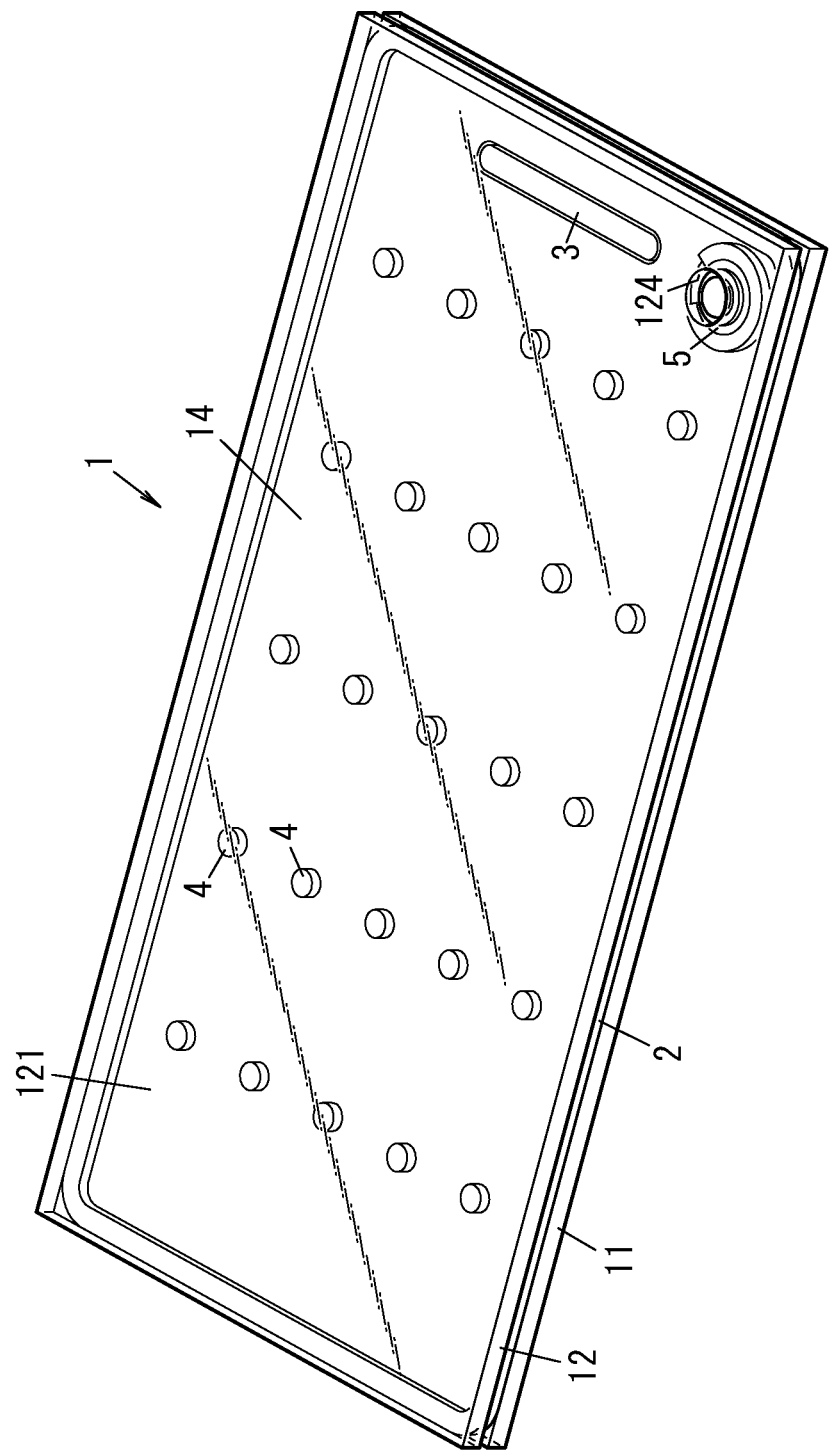
FIG. 1 is a perspective view illustrating a glass panel unit of an embodiment of the present disclosure.

A gas adsorption unit 3 of the present embodiment is used, for example, to adsorb gas present in an internal space 14 formed in a glass panel unit 1 shown in FIG. 1.

Figure 2:
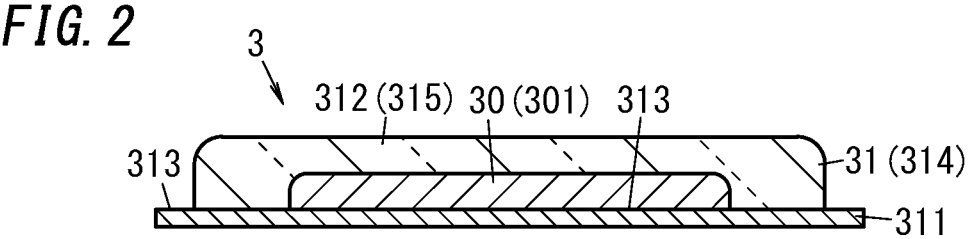
FIG. 2 is a sectional view illustrating a gas adsorption unit used in manufacturing of the glass panel unit.

The gas adsorption unit 3 of the present embodiment includes a getter 30 and a package 31 as shown in FIG. 2.

The getter 30 is, for example, a non-metal getter (evaporative getter), a metal getter (non-evaporative getter), or a getter containing both a non-metal getter and a metal getter.

The non-metal getter is a porous getter onto which gas molecules are physically adsorbed due to van der Waals' force. The non-metal getter is, for example, a getter containing zeolite, activated carbon, or magnesium oxide.

The zeolite may be an ion-exchanged zeolite or a non-ion exchanged zeolite. The ion-exchanged zeolite includes, as an ion exchanger substance, for example, a copper ion, a potassium ion, an ammonium ion, a barium ion, a strontium ion, a sodium ion, a calcium ion, a ferrous ion, an aluminum ion, a magnesium ion, a lithium ion, or a hydrogen ion.

The metal getter is a getter having a metal surface provided to chemically adsorb gas molecules. The metal getter is, for example, a zirconium-based alloy getter such as a Zr—Al getter or a Zr—V—Fe getter, or a titanium-based alloyed getter.

The getter 30 is accommodated in the package 31 with the getter 30 being in an activated state by an activation process. The non-metal getter is heated to a predetermined temperature (activation temperature) or higher so as to release adsorbed molecules (gas). Thus, the non-metal getter is heated to, for example, the predetermined temperature or higher, thereby regaining an adsorption capability and getting into an activated state where the non-metal getter has an increased adsorption capability. Alternatively, the metal getter is heated to, for example, a predetermined temperature (activation temperature) or higher, and thereby, gas adsorbed on a surface of the metal getter is spread in the internal space, which results in an activated state where the surface has a high adsorption capability.

The getter 30 of the present embodiment is an ion-exchanged zeolite and is specifically a zeolite ion-exchanged with a copper ion. Therefore, the getter 30 is configured to adsorb, for example, nitrogen, oxygen, water, hydrogen, methane, ethane, and ammonia.

The getter 30 is entirely enclosed by the package 31 so as not to come into contact with external air. Thus, the getter 30 is sealed with the package 31 with the getter 30 being in the activated state. Therefore, the getter 30 in the package 31 is kept in the activated state.

The package 31 of the present embodiment includes a base 311 and a protective layer 312. The base 311 is, for example, a member formed of a material such as metal, glass, or ceramics.

In the present embodiment, the getter 30 is stacked on one surface 313 in a thickness direction of the base 311, and the getter 30 is formed as a layer extending along the surface 313 of the base 311. The getter 30 extends entirely on the base 311 except for a peripheral portion of the surface 313.

The protective layer 312 is made of, for example, glass or ceramics. The protective layer 312 of the present embodiment is stacked on the getter 30 to extend entirely on a part which is an external surface of the getter 30 and which is not covered with the base 311. The protective layer 312 has a peripheral portion stacked on a peripheral portion of the surface 313 of the base 311. The protective layer 312 is formed as a layer extending substantially along the surface 313 of the base 311. The getter 30 is sealed with the base 311 and the protective layer 312.

(Method for Manufacturing Gas Adsorption Unit)

The method for manufacturing the gas adsorption unit of the present embodiment includes a preparation step, an activation step, a sealing step, and a package material cooling step.

(Preparation Step)

The preparation step is a step of wrapping the getter 30 with a package material 314. The package material 314 is a material for the package 31 and becomes the package 31 through the preparation step, activation step, sealing step, and package material cooling step.

The package material 314 of the present embodiment includes the base 311 and a protective layer material 315. The base 311 of the present embodiment is metal foil.

The protective layer material 315 is a material for the protective layer 312, and a cured material of the protective layer material 315 is the protective layer 312.

The protective layer material 315 of the present embodiment is a paste-like material containing powder 316 (see FIG. 4A) and a binder. The powder 316 is glass or ceramics. The binder enhances the dispersibility of the powder 316. The powder 316 has a softening point higher than the temperature (activation temperature) at which the getter 30 is activated. The activation temperature of the getter 30 of the present embodiment is about 350° C., and the softening point of the powder 316 is about 600° C.

The protective layer material 315 in the present embodiment is such a material that results in that the thermal expansion coefficient of the protective layer 312 is substantially equal to the thermal expansion coefficient of the base 311.

Specifically, the protective layer material 315 of the present embodiment is a glass paste containing glass powder (hot melt glass) as the powder 316. As the glass paste, for example, a glass paste containing barium oxide, boric oxide, and zinc oxide as main components is used.

The protective layer material 315 of the present embodiment is applied within the range of one surface of the base 311, and the base 311 has a peripheral portion located on an outer side of the protective layer material 315 as seen in the thickness direction of the base 311. Therefore, when the protective layer 312 is broken in the activation step described later, fragments of the protective layer 312 easily hit the base 311, and the fragments of the protective layer 312 are hardly scattered.

Figure 3:
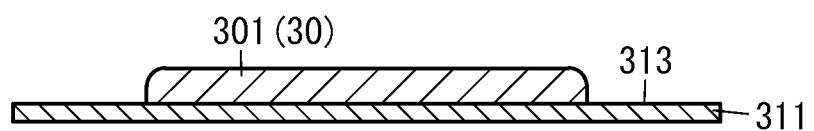
FIG. 3 is a sectional view illustrating a state where a getter is stacked on a base in a step for manufacturing the gas adsorption unit.

The preparation step of the present embodiment includes a first stacking step and a second stacking step. The first stacking step is a step of stacking the getter 30 on the base 311 as shown in FIG. 3. The second stacking step is a step of stacking the protective layer material 315 on the getter 30 stacked on the base 311 to wrap the getter 30 with the base 311 and the protective layer material 315 (see FIG. 4A).

The getter 30 of the present embodiment is a cured material of a getter material 301 made of fluid containing a powder getter 30. The getter material 301 is, for example, a dispersion liquid obtained by dispersing powder to be the getter 30 in liquid, or a solution obtained by dissolving the powder to be the getter 30 in liquid.

In the first stacking step of the present embodiment, as shown in FIG. 3, the getter material 301 is applied to the surface 313 of the base 311, and the getter material 301 is then cured by being dried. The getter 30 made of the getter material 301 is thus stacked on the base 311.

The second stacking step is performed after the first stacking step. In the second stacking step of the present embodiment, the protective layer material 315 is applied to a surface of the getter 30 stacked on the base 311 in the first stacking step, and the protective layer material 315 is then dried (see FIG. 4A). The protective layer material 315 is thus stacked on the getter 30, and a complex 33 including the getter 30 and the package material 314 (the base 311 and the protective layer material 315) enclosing the getter 30 is obtained.

(Activation Step)

The activation step is performed after the preparation step. The activation step is a step of heating the getter 30 wrapped in the package material 314 (the base 311 and the protective layer material 315) as sown in FIG. 4A to activate the getter 30.

In the activation step of the present embodiment, the complex 33 obtained in preparation step is entirely heated in an evacuated atmosphere (evacuation space) formed in an evacuation chamber (vacuum chamber) which is not shown so as to activate the getter 30.

Figure 4A:
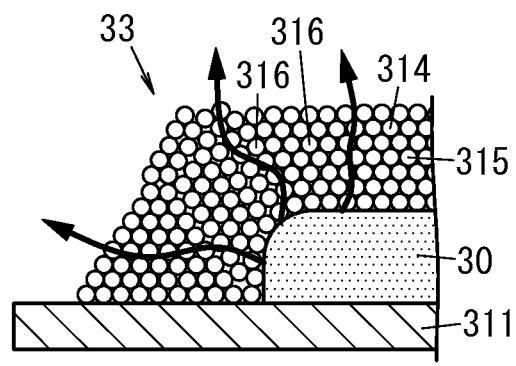
FIGS. 4A to 4C are enlarged sectional views sequentially showing steps for manufacturing the gas adsorption unit.

When the complex 33 is heated as described above, the getter 30 releases gas adsorbed on the getter 30 as shown in FIG. 4A. Moreover, heating the complex 33 removes the binder contained in the protective layer material 315.

The gas released from the getter 30 in the manner as described above passes between adjacent particles of the powder 316 of the protective layer material 315 dried and is released to the outside of the package material 314. Thus, the getter 30 is properly activated and gets into the activated state with an increased gas adsorption capacity.

Figure 4B:
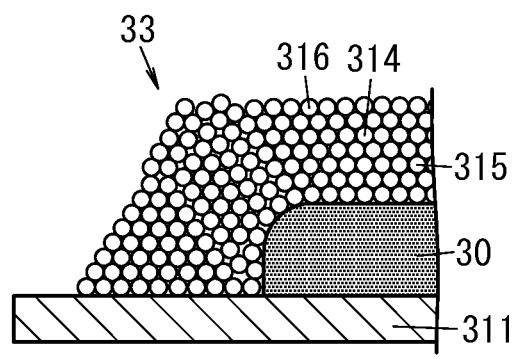

FIG. 4B shows the activated state of the getter 30 by heating the complex 33.

(Sealing Step)

The sealing step is performed after the activation step. The sealing step is a step of melting the package material 314 by heating the package material 314 so as to seal, with the package material 314, the getter 30 activated in the activation step.

Figure 4C:
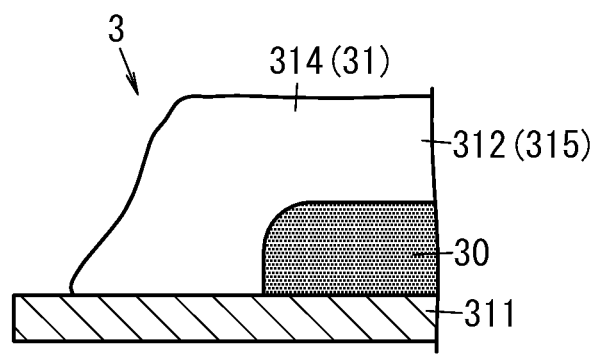

In the sealing step of the present embodiment, the complex 33 is entirely heated at a temperature higher than the heating temperature in the activation step. The complex 33 includes the getter 30 in the activated state where the getter 30 is activated in the evacuated atmosphere formed in the evacuation chamber in the activation step. That is, in this case, the complex 33 is heated to a temperature higher than the heating temperature in the activation step. Thus, the powder 316 contained in the protective layer material 315 is heated so as to be melted. In this way, the getter 30 in the activated state is sealed with the base 311 and the protective layer material 315 containing the powder 316 melted as shown in FIG. 4C.

(Package Material Cooling Step)

The package material cooling step is performed after the sealing step. In the package material cooling step, the protective layer material 315 melted in the sealing step is cooled. This cures the protective layer material 315 to become the protective layer 312 (i.e., the package material 314 becomes the package 31), thereby providing the gas adsorption unit 3 with the getter 30 being sealed with the package 31.

(Glass Panel Unit)

Next, the glass panel unit 1 manufactured to include the gas adsorption unit 3 of the present embodiment will be described.

Figure 5:
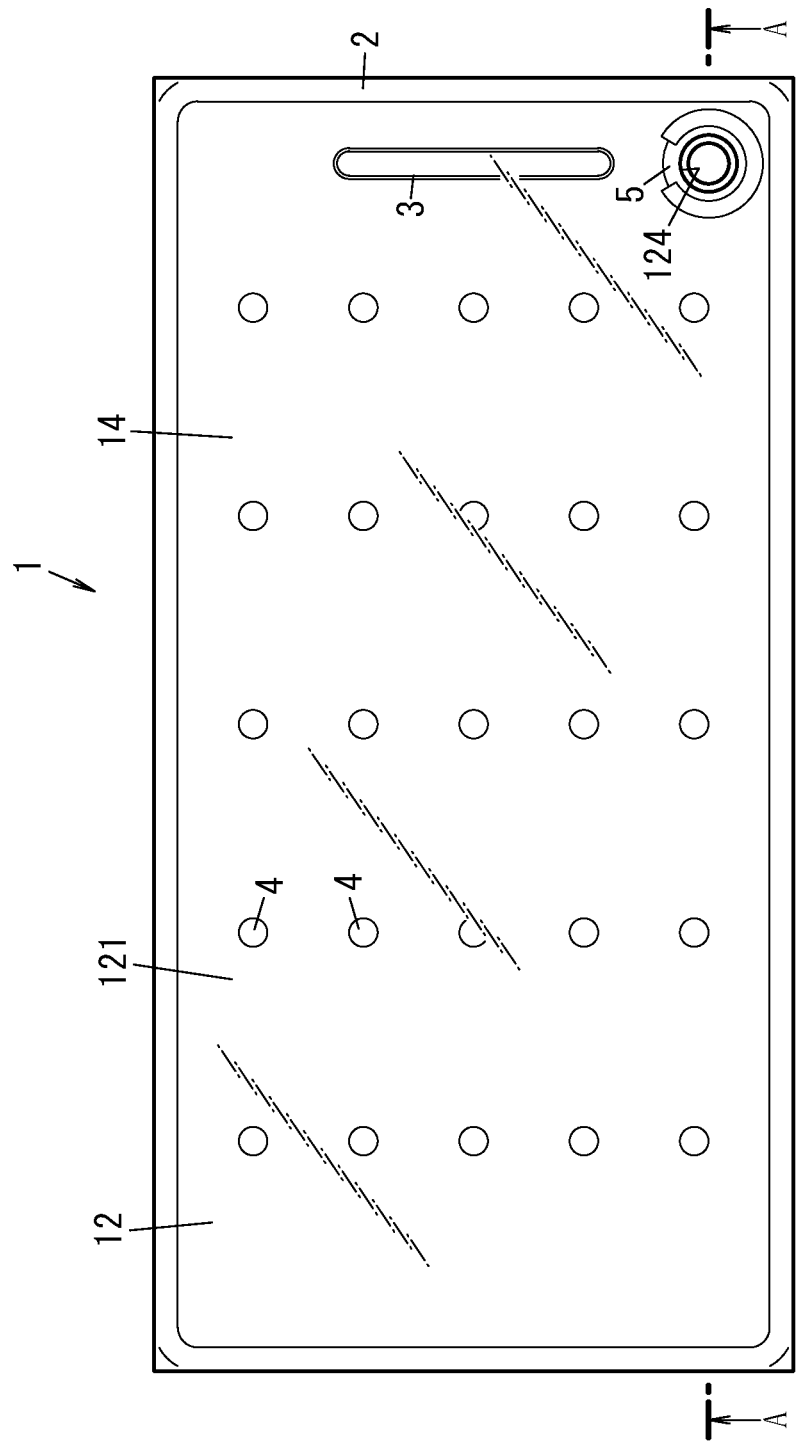
FIG. 5 is a plan view of the glass panel unit.
Figure 6:
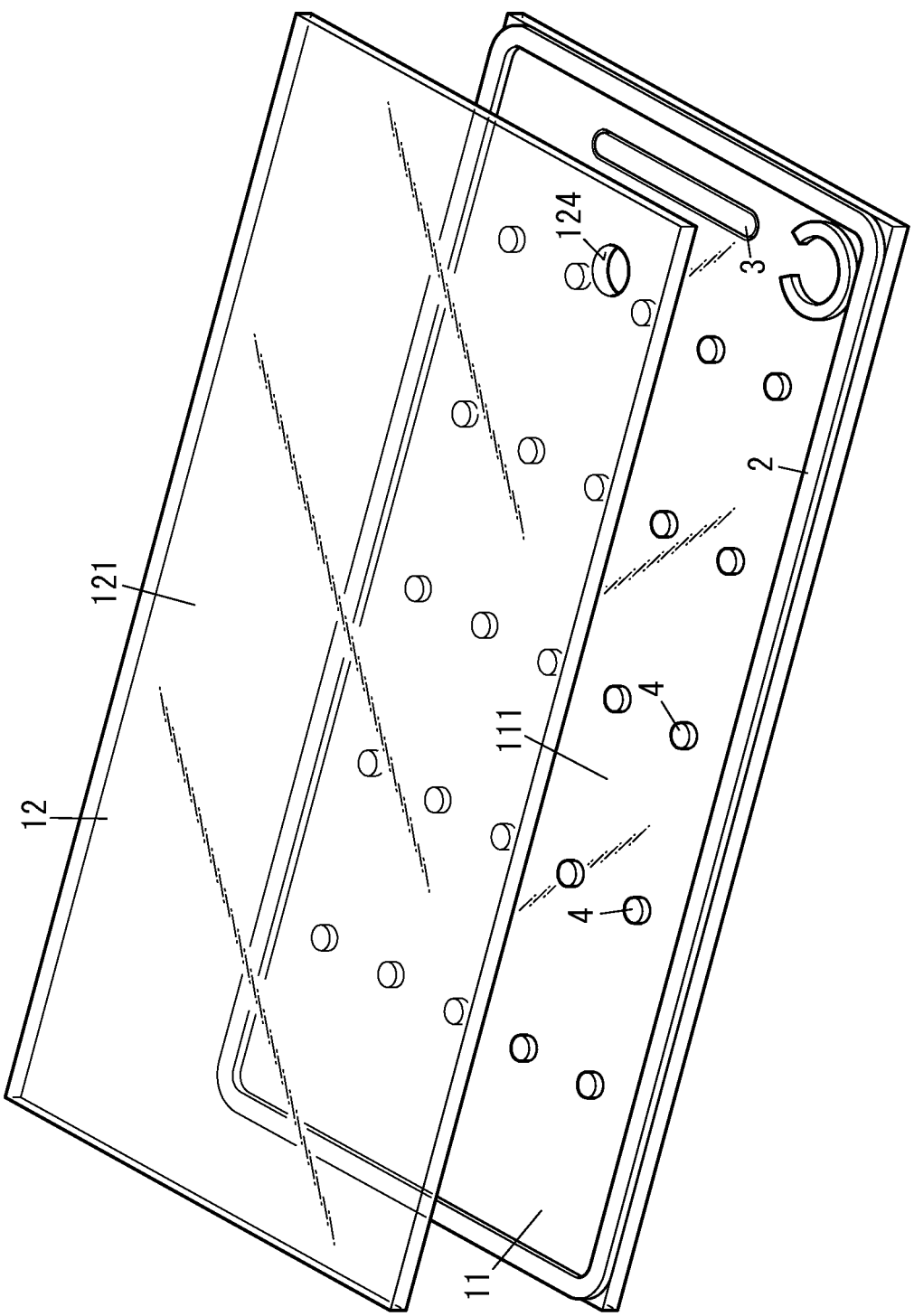
FIG. 6 is an exploded perspective view of the glass panel unit.

As illustrated in FIGS. 1, 5, and 6, the glass panel unit 1 of the present embodiment includes a first substrate 11, a second substrate 12, a sealing body 2, the gas adsorption unit 3, a plurality (a large number of) of pillars 4, and a hermetically closing body 5.

Each of the first substrate 11 and the second substrate 12 of the present embodiment has a rectangular plate shape. The first substrate 11 and the second substrate 12 face each other with a distance therebetween in a thickness direction of the first substrate 11. The first substrate 11 and the second substrate 12 are parallel to each other. The sealing body 2 and the plurality of pillars 4 are disposed between the first substrate 11 and the second substrate 12.

Figure 7:
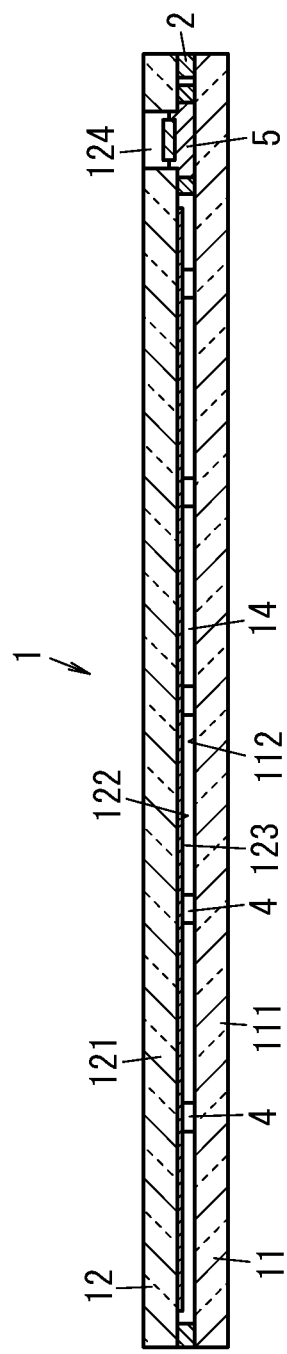
FIG. 7 is a sectional view along line A-A of FIG. 5.

As shown in FIG. 7, the first substrate 11 includes a glass panel 111. The second substrate 12 includes a glass panel 121 and a low-emissivity film (heat reflective film) 123. The low-emissivity film 12 is stacked on the glass panel 121. In the following description, the glass panel 111 will be referred to as a "first glass panel 111", and the glass panel 121 will be referred to as a "second glass panel 121".

Each of the first glass panel 111 and the second glass panel 121 is, for example, a panel formed of a material such as soda-lime glass, high strain-point glass, chemically strengthened glass, no-alkali glass, quartz glass, Neoceram or physically strengthened glass.

The first substrate 11 has surfaces on both sides in its thickness direction, and one surface 112 of the surfaces faces the second substrate 12. The surface 112 of the first substrate 11 is a surface of the first glass panel 111.

The second substrate 12 has surfaces on both sides in its thickness direction, and one surface 122 of the surfaces faces the first substrate 11. The surface 112 and the surface 122 face each other. A large portion of the surface 122 of the second substrate 12 is a surface of the low-emissivity film 123.

The low-emissivity film 123 is a film containing metal, such as silver, with low emissivity and reduces heat transfer due to radiation. Note that the low-emissivity film 123 has a small thickness and thus transmits light. Therefore, the low-emissivity film 123 hardly affects the transparency of the glass panel unit 1. The low-emissivity film 123 is not stacked on the peripheral portion of the surface of the second glass panel 121 facing the first glass panel 111.

As shown in FIGS. 1 and 5, the sealing body 2 disposed between the first substrate 11 and the second substrate 12 has a frame shape. A sealing material 20 (see FIG. 9A) serving as the material for the sealing body 2 is, for example, a glass paste containing glass frit. The sealing material 20 of the present embodiment has a melting point lower than a melting point of the protective layer 312 of the gas adsorption unit 3.

The sealing body 2 of the present embodiment has a rectangular frame shape. As illustrated in FIG. 7, the sealing body 2 is hermetically bonded to the peripheral portion of the first substrate 11 and to the peripheral portion of the second substrate 12. Thus, the peripheral portions of the first substrate 11 and the second substrate 12 are hermetically bound to each other with the sealing body 2. The glass panel unit 1 has the internal space 14. The internal space 14 is surrounded by the first substrate 11, the second substrate 12, and the sealing body 2.

The second substrate 12 has an evacuation port 124 formed to penetrate the second substrate 12 in a thickness direction of the second substrate 12. The evacuation port 124 is used to discharge air of the internal space 14 in the course of manufacturing the glass panel unit 1 (evacuation and hermetically closing step described later).

The evacuation port 124 is sealed with the hermetically closing body 5. Thus, the internal space 14 of the glass panel unit 1 is hermetically closed. The hermetically closing body 5 is formed from, for example, a glass adhesive containing glass frit.

The internal space 14 is, for example, an evacuated space evacuated to a degree of vacuum of 0.1 Pa or lower. Thus, the glass panel unit 1 is highly thermally insulating.

The plurality of pillars 4 are dispersed in the internal space 14 so as to be spaced apart from each other. The pillars 4 are formed of: a glass adhesive containing glass frit; a resin; metal; or the like. Pillars 4 are transparent or semi-transparent.

The pillars 4 are in contact with the surface 112 of the first substrate 11 and the surface 122 of the second substrate 12. The plurality of pillars 4 maintain the distance between the first substrate 11 and the second substrate 12 at a predetermined distance.

Figure 8:
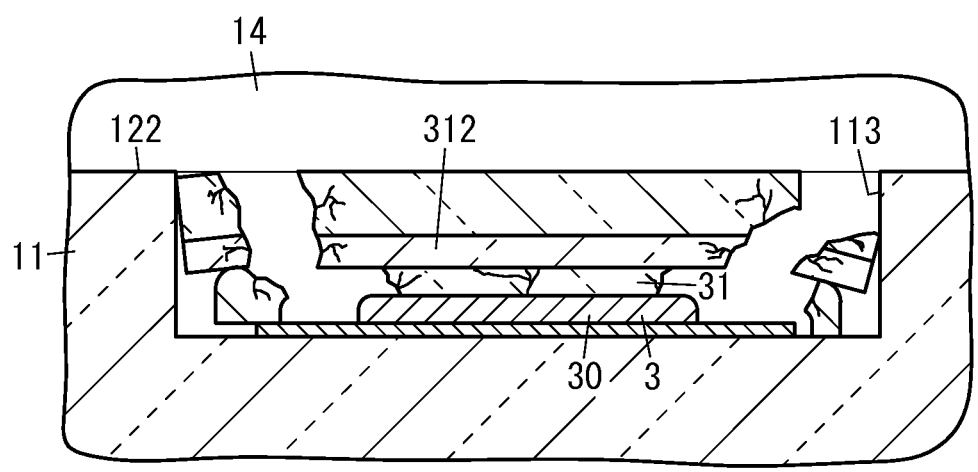
FIG. 8 is a sectional view illustrating the gas adsorption unit of the glass panel unit.

In the internal space 14 of the glass panel unit 1, the gas adsorption unit 3 shown in FIG. 8 is disposed. The package 31 of the gas adsorption unit 3 is broken in the course of manufacturing the glass panel unit 1 which will be described later, so that the getter 30 is exposed to the outside of the package 31.

(Method for Manufacturing Glass Panel Unit)

Next, a method for manufacturing the glass panel unit 1 of the present embodiment will be described. The method for manufacturing the glass panel unit 1 of the present embodiment includes a disposition step, a bonding step, an evacuation and hermetically closing step, and a cooling step.

(Disposition Step)

Figure 9A:
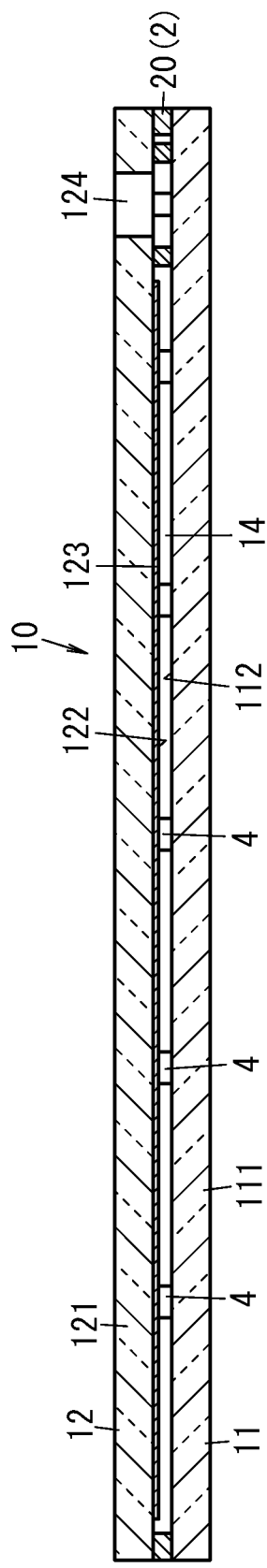
FIGS. 9A and 9B are sectional views for sequentially illustrating a method for manufacturing the glass panel unit.

As illustrated in FIG. 9A, the disposition step is a step of disposing the first substrate 11 and the second substrate 12 to face each other with the sealing material 20 having a frame shape provided therebetween to form the internal space 14 surrounded by the first substrate 11, the second substrate 12, and the sealing material 20.

The sealing material 20 is included in the sealing body 2 in glass panel unit 1. The second substrate 12 has an evacuation port 124 formed to penetrate the second substrate 12 in a thickness direction of the second substrate 12.

In the disposition step of the present embodiment, the first substrate 11 is disposed with the surface 112 facing upwards. The sealing material 20, the plurality of pillars 4, and the gas adsorption unit 3 (see FIG. 10) are disposed on the surface 112 of the first substrate 11. The second substrate 12 is also placed above the first substrate 11 via the sealing material 20 and the plurality of pillars 4. Thus, the glass composite 10 including the first substrate 11, the second substrate 12, the sealing material 20, and the gas adsorption unit 3 is assembled.

In the disposition step, the sealing material 20 is applied in a frame shape along an outer peripheral edge of the surface 112 of the first substrate 11 by using an application apparatus such as, for example, a dispenser. Moreover, the plurality of pillars 4 are regularly arranged in an area which is part of the surface 112 of the first substrate 11 and which is surrounded by the sealing material 20.

Figure 10:
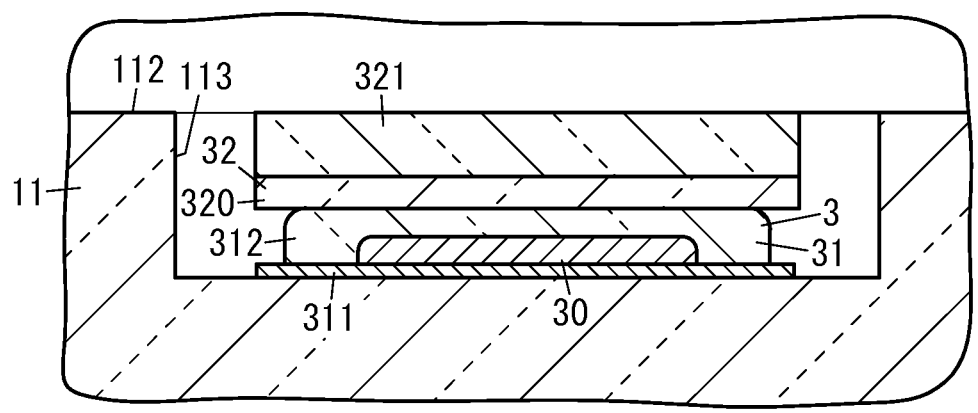
FIG. 10 is a sectional view illustrating a main part of a glass composite obtained in a step for manufacturing the glass panel unit.

In the disposition step, the gas adsorption unit 3 (see FIG. 10) is disposed in the area which is the part of the surface 112 of the first substrate 11 and which is surrounded by the sealing material 20. As illustrated in FIG. 10, the gas adsorption unit 3 of the present embodiment is disposed in a recess 113 formed in the surface 112 of the first substrate 11. Therefore, also when the distance between the first substrate 11 and the second substrate 12 is short, it is possible to dispose the gas adsorption unit 3 in the internal space 14 and to reduce the thickness of the glass panel unit 1.

In the gas adsorption unit 3 of the present embodiment, the package 31 (specifically, the base 311) is disposed on a bottom surface of the recess 113 formed in the surface 122 of the first substrate 11 and is accommodated in the recess 113.

In disposition step, a connector 32 having a thermal expansion coefficient different from the thermal expansion coefficient of the package 31 is disposed on an outer surface of the package 31. The connector 32 of the present embodiment includes a low-melting-point member 320 and a connection member 321.

In disposition step, the low-melting-point member 320 is placed in a solid state on the outer surface of the package 31. The low-melting-point member 320 of the present embodiment is arranged on an upper surface of the package 31 (specifically, the protective layer 312). The low-melting-point member 320 has a melting point lower than a melting point of the package 31 (specifically, the protective layer 312 and the base 311) and lower than the melting point of the sealing material 20. The low-melting-point member 320 of the present embodiment is vanadium-based low melting glass.

In the disposition step, the connection member 321 is arranged along an opposite surface of the low-melting-point member 320 from the package 31, thereby disposing the connection member 321 along the outer surface of the package 31 via the low-melting-point member 320. The connection member 321 of the present embodiment is arranged on an upper surface of the low-melting-point member 320 and is arranged along the upper surface of the package 31 (specifically, the protective layer 312) via the low-melting-point member 320.

The thermal expansion coefficient of the connection member 321 is different from the thermal expansion coefficient of the package 31. The connection member 321 of the present embodiment is borosilicate glass, and the thermal expansion coefficient of the connection member 321 is smaller than the thermal expansion coefficient of the package 31. The borosilicate glass has a thermal expansion coefficient of 3.3 ppm/K.

In the disposition step, the low-melting-point member 320 is fixed to neither the package 31 nor the connection member 321. Thus, in the disposition step, the package 31 is disposed such that the connection member 32 does not obstruct thermal deformation of the package 31, and thermal stress hardly occurs at the package 31.

(Bonding Step)

The bonding step is performed after the disposition step. The bonding step is a step of heating the glass composite 10 shown in FIG. 9A to melt the sealing material 20 such that the sealing material 20 hermetically bonds the first substrate 11 and the second substrate 12 to each other.

Figure 11:
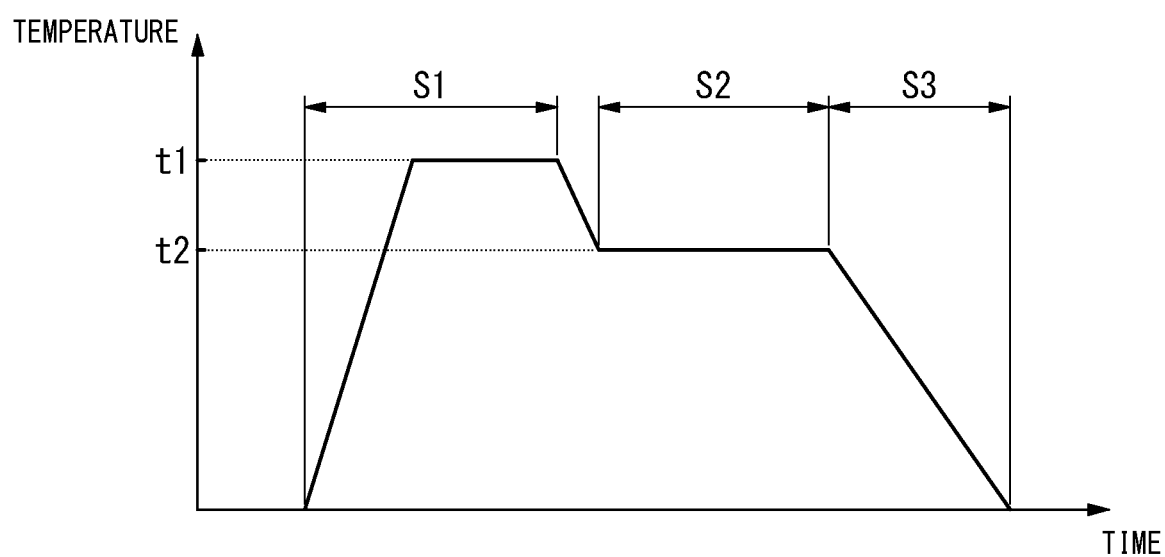
FIG. 11 is a graph illustrating a change in heating temperature of the glass composite in steps for manufacturing the glass panel unit.

In the bonding step of the present embodiment, the glass composite 10 assembled in the disposition step is entirely heated in an oven such as a circulating hot air oven. FIG. 11 is a graph showing a change in heating temperature (in-furnace temperature) of the glass composite 10. In FIG. 11, the range indicated by S1 is a time period corresponding to the bonding step.

The heating temperature of the glass composite 10 in the bonding step is temperature t1 higher than the melting point of the sealing material 20. Thus, in the bonding step, the sealing material 20 surrounding the internal space 14 of the glass composite 10 shown in FIG. 9A is melted, and the sealing material 20 is bonded to the first substrate 11 and the second substrate 12.

The periphery of the internal space 14 is sealed with the sealing material 20, and the internal space 14 communicates with the outside of the glass composite 10 through only the evacuation port 124. Heating of the glass composite 10 in the bonding step continues to a time point at which the evacuation and hermetically closing step which will be described later is terminated. However, in the evacuation and hermetically closing step of the present embodiment, the heating temperature of the glass composite 10 is lowered from the temperature t1 to temperature t2 (see FIG. 11).

The melting point of the low-melting-point member 320 (see FIG. 10) is lower than the melting point of the sealing material 20. Therefore, as described above, when the glass composite 10 is heated at the temperature t1 in the bonding step, the low-melting-point member 320 is melted and is bonded to the package 31 (specifically, the protective layer 312) and the connection member 321 which are adjacent to the low-melting-point member 320. That is, the bonding step of the present embodiment serves also as a melting step of melting the low-melting-point member 320 and bonding the low-melting-point member 320 to the package 31.

The temperature t1 shown in FIG. 11 is lower than the melting point of the package 31. Thus, in the bonding step, the getter 30 is kept sealed with the package 31. Moreover, the temperature t1 is lower than a melting point of the connection member 321, and thus, the connection member 321 does not melt.

(Evacuation and Hermetically Closing Step)

The evacuation and hermetically closing step is performed after the bonding step. The evacuation and hermetically closing step is a step of evacuating and then sealing the internal space 14 of the glass composite 10 (see FIG. 9B).

The evacuation and hermetically closing step includes an evacuation step and a hermetically sealing step. The evacuation step is a step of evacuating the internal space 14 of the glass composite 10. The hermetically sealing step is a step of sealing the internal space 14 evacuated in the evacuation step.

(Evacuation Step)

Figure 9B:
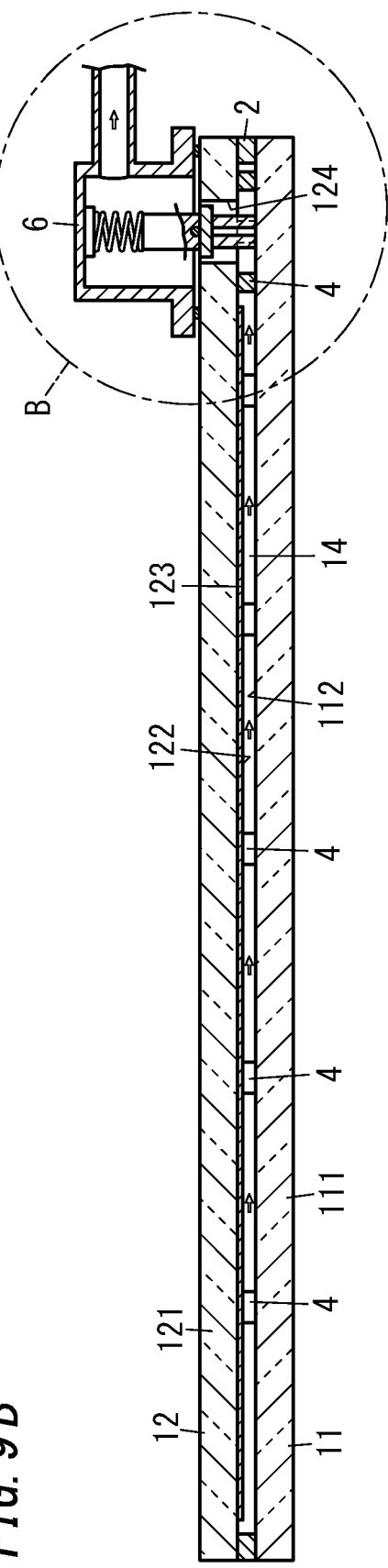

In evacuation step, as shown in FIG. 9B, air in the internal space 14 is discharged through the evacuation port 124 to the outside of the glass composite 10, thereby evacuating the internal space 14. The air in the internal space 14 is discharged (vacuumed) by, for example, a vacuum pump connected to the evacuation port 124 via an evacuation head 6.

In FIG. 11, the range indicated by S2 is a time period corresponding to the evacuation step. In evacuation step, the internal space 14 is evacuated with the glass composite 10 being heated at temperature t2 lower than the temperature t1. That is, in this case, the glass composite 10 is heated to the temperature t2. The temperature t2 is a temperature lower than or equal to a softening temperature of the sealing material 20. Therefore, in the evacuation step, the sealing material 20 is hardly deformed, and deformation of the sealing material 20 along with the evacuation of the internal space 14 hardly occurs.

Moreover, the temperature t2 is higher than the melting point of the low-melting-point member 320. Therefore, in the evacuation step, the low-melting-point member 320 is kept melted.

(Hermetically Sealing Step)

Figure 12:
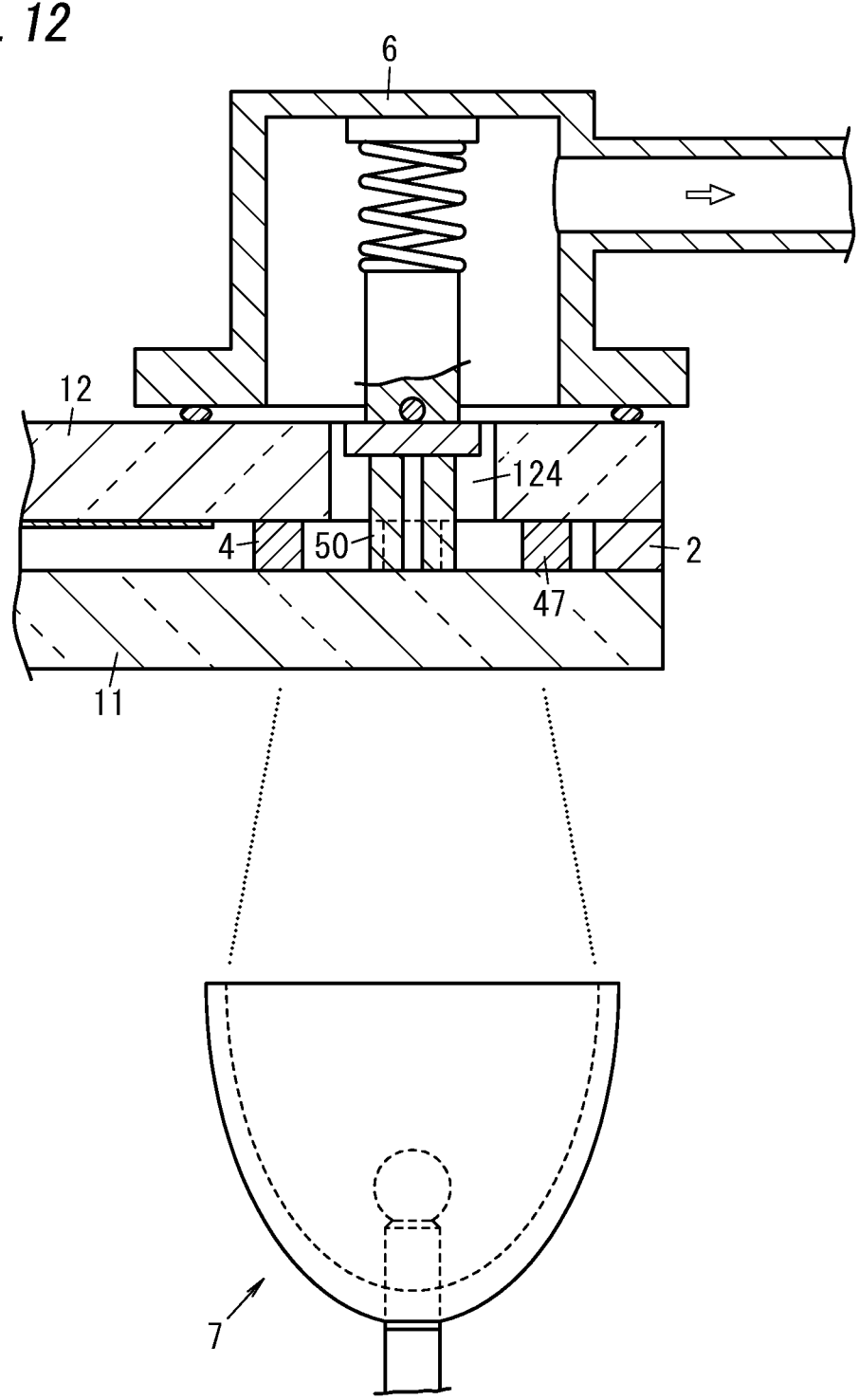
FIG. 12 is an enlarged view illustrating part B of FIG. 9B.

After the pressure in the internal space 14 becomes lower than or equal to a prescribed value in the evacuation step, the hermetically sealing step is performed. In the hermetically sealing step, the evacuation port 124 shown in FIG. 12 is sealed with the internal space 14 being kept evacuated in the evacuation step. The internal space 14 is thus a hermetically closed evacuated space.

The hermetically sealing step of the present embodiment adopts the hermetically closing material 50 to seal the evacuation port 124. The hermetically closing material 50 forms the hermetically closing body 5 of the glass panel unit 1 shown in FIG. 1.

As illustrated in FIG. 12, the hermetically closing material 50 is disposed in the evacuation port 124. In the hermetically sealing step, local heating is performed to intensively heat only part of the glass composite 10, thereby softening the hermetically closing material 50. Thus, the evacuation port 124 is sealed with the hermetically closing material 50. The local heating is performed, for example, with an irradiator 7 configured to irradiate infrared rays, laser beams, or the like. Note that the local heating of the glass composite 10 is preferably performed by heating only the hermetically closing material 50 of the glass composite 10, but the hermetically closing material 50 may be heated including its peripheral portion.

(Cooling Step)

The cooling step is performed after the evacuation and hermetically closing step. In FIG. 11, the range indicated by S3 is a time period corresponding to the cooling step. In the cooling step, heating of the glass composite 10 in the circulating hot air oven or the like, which has been continuously performed from the bonding step, is stopped, thereby entirely cooling the glass composite 10. The glass composite 10 is cooled in this manner, and thereby, the sealing material 20 is cured to become the sealing body 2, and the hermetically closing material 50 is cured to become the hermetically closing body 5. Thus, the glass panel unit 1 shown in FIG. 1 is obtained.

Cooling the glass composite 10 in the cooling step cools and cures the low-melting-point member 320 (see FIG. 10) melted in the melting step (bonding step). This connects the package 31 (specifically, the protective layer 312) shown in FIG. 10 to the connection member 321 via the low-melting-point member 320. In other words, the cooling step of the present embodiment serves also as a curing step of cooling and curing the low-melting-point member 320 to connect the package 31 to the connection member 32 including the low-melting-point member 320.

The low-melting-point member 320 curs in the above-described manner, and thereby, the connection member 32 (the connection member 321) limits the thermal deformation of the protective layer 312 of the package 31, which leads to a state where the thermal stress is likely to occur.

The glass composite 10 in the cooling step is continuously cooled also after the low-melting-point member 320 is cured. The protective layer 312 and the connector 32 of the gas adsorption unit 3 are thus cooled and shrink. Here, the connector 32 (connection member 321) limits deformation of the protective layer 312. Thus, thermal stress occurs at the protective layer 312 due to the difference between the thermal expansion coefficient of the protective layer 312 and the thermal expansion coefficient of the connector 32 (the connection member 321) connected to the protective layer 312. The thermal stress breaks the protective layer 312 as shown in FIG. 8, thereby removing sealing of the getter 30 with the package 31. That is, the cooling step of the present embodiment serves also as an unsealing step of causing the thermal stress to occur at the package 31 to break the package 31.

When the package 31 is broken in the unsealing step (cooling step), the getter 30 which is in the activated state and which is accommodated in the package 31 is exposed to the outside of the package 31. Therefore, the gas in the internal space 14 of the glass composite 10 is adsorbed on the getter 30.

In the gas adsorption unit 3 of the present embodiment, the getter 30 is sealed with the package 31 until the unsealing step (the cooling step) performed after the evacuation and hermetically closing step. Therefore, the adsorbing capability of the getter 30 is hardly deteriorated. This enables the getter 30 to efficiently adsorb the gas generated in the internal space 14 of the glass composite 10 after the evacuation and hermetically closing step. Thus, it is possible to obtain the glass panel unit 1 having an excellent degree of vacuum.

The glass panel unit 1 of the present embodiment, manufactured through the above-described steps, has the internal space 14 evacuated and is thus highly thermally insulating.

(Variation)

Next, variations of the method for manufacturing the glass panel unit 1 of the embodiment will be described. Note that in the following description of first to fourth variations, components common with those in the embodiment are denoted by the same reference signs, and the description thereof is omitted.

(First Variation)

Figure 13:
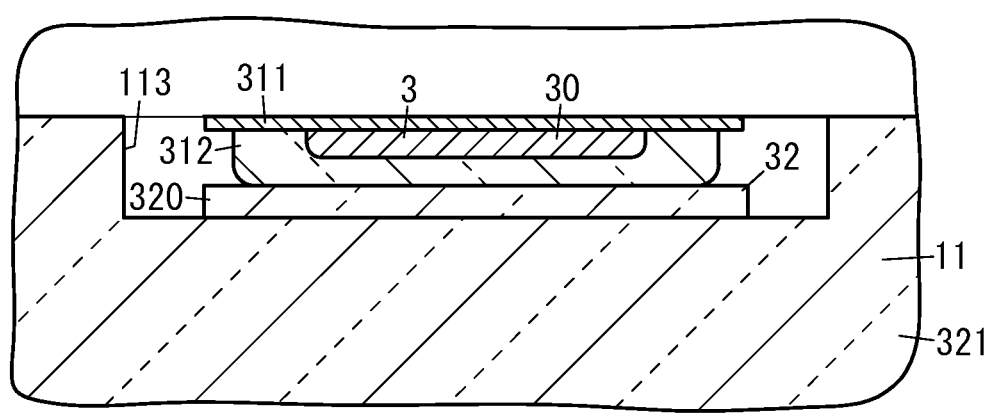
FIG. 13 is a sectional view illustrating a main part of a glass composite obtained in a step for manufacturing a glass panel unit of a first variation.

The first variation will be described. As shown in FIG. 13, a connection member 321 used in a method for manufacturing a glass panel of the present variation is a first substrate 11 (a first glass panel 111), and the first substrate 11 has a thermal expansion coefficient greater than a thermal expansion coefficient of a protective layer 312. The connector 32 of the present embodiment includes the first substrate 11 (the connection member 321) and the low-melting-point member 320.

As illustrated in FIG. 13, in a disposition step, a low-melting-point member 320 is disposed on a bottom surface of a recess 113 formed in the first substrate 11, and a gas adsorption unit 3 is disposed above an upper surface of the low-melting-point member 320. At this time, the gas adsorption unit 3 is disposed on the protective layer 312 provided along the upper surface of the low-melting-point member 320.

In present variation, when the low-melting-point member 320 is melted by being heated in a melting step (bonding step), the low-melting-point member 320 is bonded to the protective layer 312 and the first substrate 11 (the connection member 321) which are adjacent to the low-melting-point member 320. Thereafter, the low-melting-point member 320 is cured by being cooled in a curing step (a cooling step), the protective layer 312 is then connected to the first substrate 11 via the low-melting-point member 320, and the first substrate 11 limits thermal deformation of the package 31. Thereafter, when the package 31 and the first substrate 11 are cooled and shrink in an unsealing step (a cooling step), the protective layer 312 breaks due to the difference of the thermal expansion coefficient between the protective layer 312 and the first substrate 11.

In the present variation, the first substrate 11 serves also as the connection member 321, which enables the number of members used for manufacturing the glass panel unit 1 to be reduced. In addition, since a member being different from the first substrate 11 and serving as the connection member 321 does not have to be disposed in the disposition step, the glass panel unit 1 can be easily manufactured.

(Second Variation)

Figure 14:
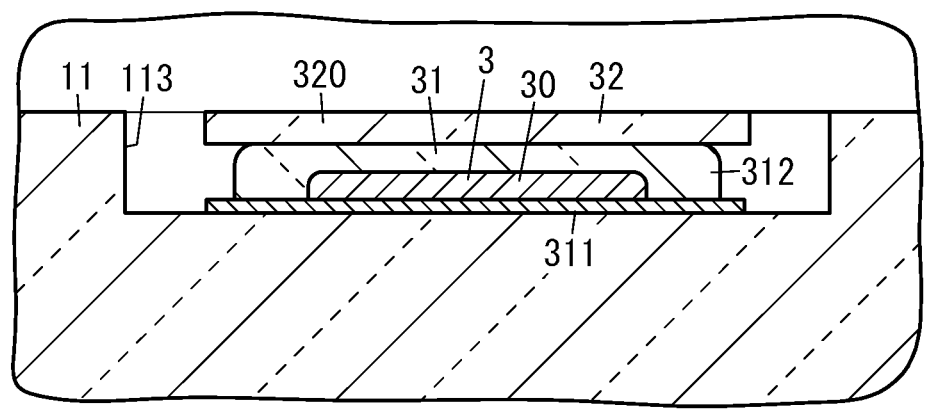
FIG. 14 is a sectional view illustrating a main part of a glass composite obtained in a step for manufacturing a glass panel unit of a second variation.

Next, the second variation will be described. A connector 32 used in a method for manufacturing a glass panel unit 1 of the present variation shown in FIG. 14 includes only a low-melting-point member 320, and the low-melting-point member 320 has a thermal expansion coefficient smaller than a thermal expansion coefficient of a protective layer 312.

In present variation, when the low-melting-point member 320 is melted by being heated in a melting step (bonding step), the low-melting-point member 320 (the connector 32) is bonded to the protective layer 312 adjacent thereto. Thereafter, the low-melting-point member 320 is cured by being cooled in a curing step (a cooling step), the protective layer 312 is then connected to the low-melting-point member 320, and the low-melting-point member 320 thus cured limits thermal deformation of a package 31. Thereafter, when the package 31 and the low-melting-point member 320 are cooled and shrink in an unsealing step (a cooling step), the protective layer 312 breaks due to the difference of the thermal expansion coefficient between the protective layer 312 and the low-melting-point member 320.

The present variation enables the package 31 to be broken without using the connection member 321 and enables the number of members used to manufacture the glass panel unit 1 to be reduced. In addition, since there is no need to dispose the connection member 321 in the disposition step, the glass panel unit 1 is easily manufacturable.

(Third Variation)

Next, with reference to FIGS. 9A, 9B, and 10, the third variation will be described. A low-melting-point member 320 of the present variation has a melting point higher than a melting point of a sealing material 20. The low-melting-point member 320 of the present variation is not melted by a glass composite 10 being heated to melt the sealing material 20 in a bonding step.

In the present variation, a melting step of melting the low-melting-point member 320 to bond the low-melting-point member 320 to a package 31 and a connection member 321 is performed by local heating of intensively heating only part of the glass composite 10 after an evacuation and hermetically closing step (in a cooling step or after the cooling step) so as to heat the low-melting-point member 320. The local heating is performed by infrared irradiation, laser irradiation, or the like. The local heating may be performed by direct heating of the low-melting-point member 320, or by heating at least one of the package 31 or the connection member 321 to transfer the heat to the low-melting-point member 320. That is, in this case, the local heating may be performed by heating only the low-meltingpoint member 320 of the glass composite 10, or may be performed by heating only a portion around the low-melting-point member 320. Alternatively, the local heating may be performed by heating only a portion around the low-melting-point member 320 and the low-melting-point member 320 of the glass composite 10.

The local heating described above is stopped after, for example, a predetermined time. Thus, a curing step and an unsealing step are performed. The curing step is a step of cooling and curing the low-melting-point member 320. The unsealing step is a step of further cooling a gas adsorption unit 3 including the low-melting-point member 320 thus cured so as to break the package 31.

In present variation, the above-described melting step is performed, and thereby, a member having a melting point higher than the melting point of the sealing material 20 can be used as the low-melting-point member 320.

(Fourth Variation)

Next, with reference to FIG. 10, the fourth variation will be described. In present variation, an unsealing step of causing thermal stress at a package 31 to break the package 31 is performed after an evacuation and hermetically closing step (in a cooling step or after the cooling step). The unsealing step is performed by local heating of intensively heating only part of a glass composite 10 so as to heat one or both of the package 31 (specifically, a protective layer 312) and a connection member 321. The local heating is performed by infrared irradiation, laser irradiation, or the like.

In present variation, the local heating is performed in a manner as described above to cause thermal stress to occur at the package 31, which enables the package 31 to be broken.

Note that the unsealing step performed in the third variation described above may be the unsealing step of present variation.

(Fifth Variation)

Next, with reference to FIGS. 9A, 9B, and 10, a fifth variation will be described. Incidentally, in the bonding step in the embodiment, the glass composite 10 has to be heated to a temperature at which the sealing material 20 is meltable, but in order to save energy, the heating temperature of the glass composite 10 is preferably low. However, since the ignition temperature of cotton as a main component of dust is 407° C., the dust may remain in the interior of the glass composite 10 when the glass composite 10 is heated at 407° C. or lower. Thus, if the dust remains in the interior of the glass composite 10, carbon hydride-based gas may be released from the dust, which my deteriorate the degree of vacuum.

The present variation addresses this problem by heating a glass composite 10 at 407° C. or lower in a bonding step to melt a sealing material 20. That is, in this case, the glass composite 10 is heated to 407° C. or lower. Moreover, a non-metal getter is used as a getter 30.

As described above, in the bonding step, the glass composite 10 is heated at 407° C. or lower to melt the sealing material 20, thereby achieving the energy saving. Even if dust remains in the glass composite 10 after the bonding step, the carbon hydride-based gas generated from this dust can be adsorbed on the getter 30 as the non-metal getter. If pillars 4 or the sealing material 20 contain(s) a resin material such as imide groups, imidazole, or oxazole, the resin material may also emit a carbon hydride-based gas or an ammonium gas. However, in present variation, the gas from these resin materials can also be adsorbed on the getter 30 including the non-metal getter. Thus, it is possible to manufacture the glass panel unit 1 having an excellent degree of vacuum.

(Sixth Variation)

Figure 15:
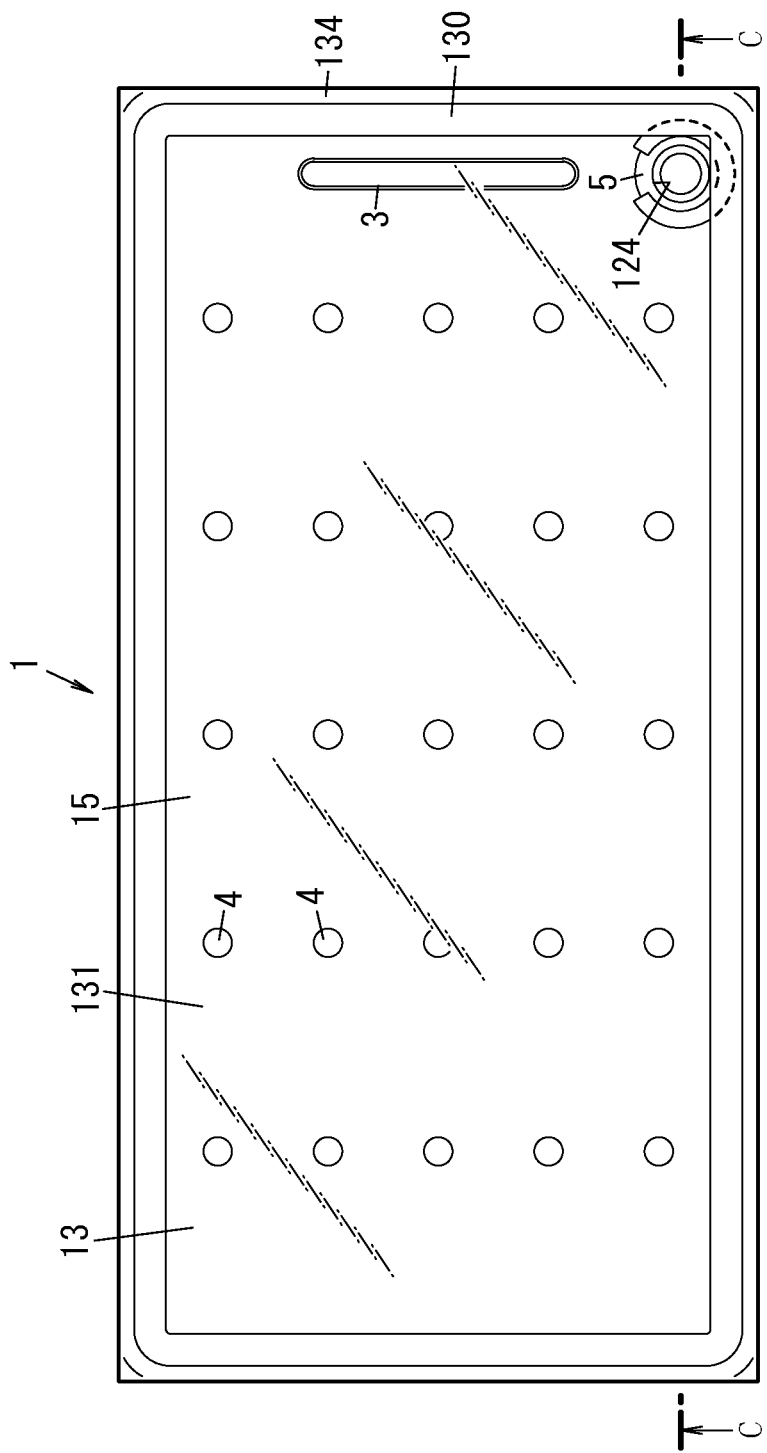
FIG. 15 is a plan view illustrating a glass panel unit of a sixth variation.
Figure 16:
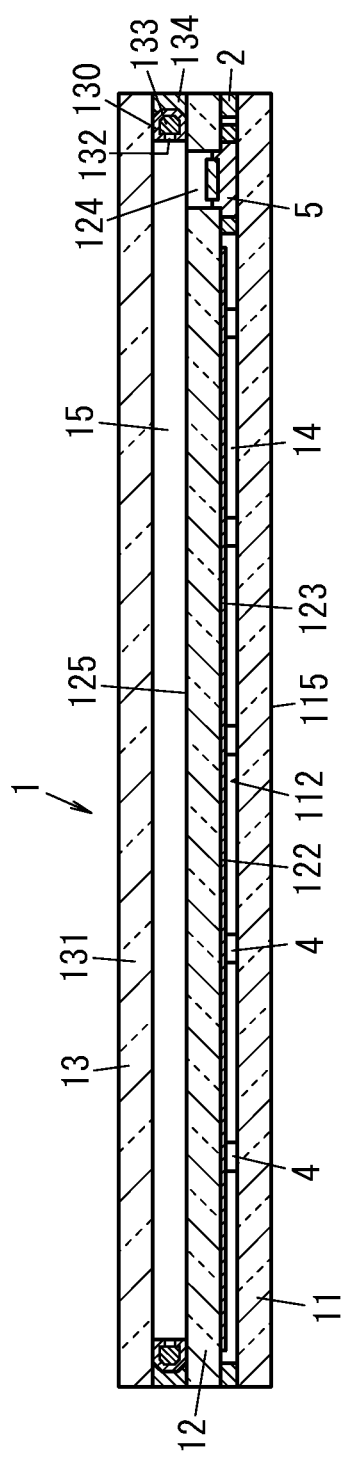
FIG. 16 is a sectional view along line C-C of FIG. 15.

Next, a sixth variation will be described. FIGS. 15 and 16 illustrate a glass panel unit 1 according to the present variation. The glass panel unit 1 of the present variation includes, in addition to a first substrate 11 and a second substrate 12, a third substrate 13.

In the glass panel unit 1 of the present variation, the third substrate 13 faces a surface 125 of the second substrate 12 facing away from the first substrate 11, and a second internal space 15 is formed between the second substrate 12 and the third substrate 13.

The third substrate 13 includes a glass panel 131. Hereinafter, the glass panel 131 is referred to as a third glass panel 131.

The glass panel unit 1 of the present variation further includes a pillar 130, a second sealing material 134, and a desiccant 133. The pillar 130 and the second sealing material 134 are disposed between peripheral portions of the second substrate 12 and the third substrate 13. The pillar 130 has a frame shape. The pillar 130 has a hollow. The second sealing material 134 has a frame shape. The second sealing material 134 covers an outer side of the pillar 130. The hollow of the pillar 130 is filled with the desiccant 133. The second internal space 15 is a space entirely surrounded by the second sealing material 134, and the pillar 130 is located in the second internal space 15.

The pillar 130 is formed of metal such as aluminum. The pillar 130 has an inner circumferential end in which a ventilation hole 132 for communication between the hollow of the pillar 130 and the second internal space 15.

The desiccant 133 is, for example, silica gel. The second sealing material 134 may be made of a highly airtight resin such as a silicone resin or butyl rubber.

The second internal space 15 surrounded by the second substrate 12, the third substrate 13, and the second sealing material 134 is a hermetically closed space that does not communicate with the outside. The second internal space 15 may be filled with drying gas (e.g., a dried noble gas such as argon or dry air).

A method for manufacturing the glass panel unit 1 of present variation includes a second bonding step in addition to the disposition step, the bonding step, the evacuation and hermetically closing step, and the cooling step as described above. The second bonding step is a step of hermetically bonding the second substrate 12 and the third substrate 13 (or the first substrate 11 and the third substrate 13) with the pillar 130 sandwiched therebetween via the second sealing material 134.

(Building Component)

Figure 17:
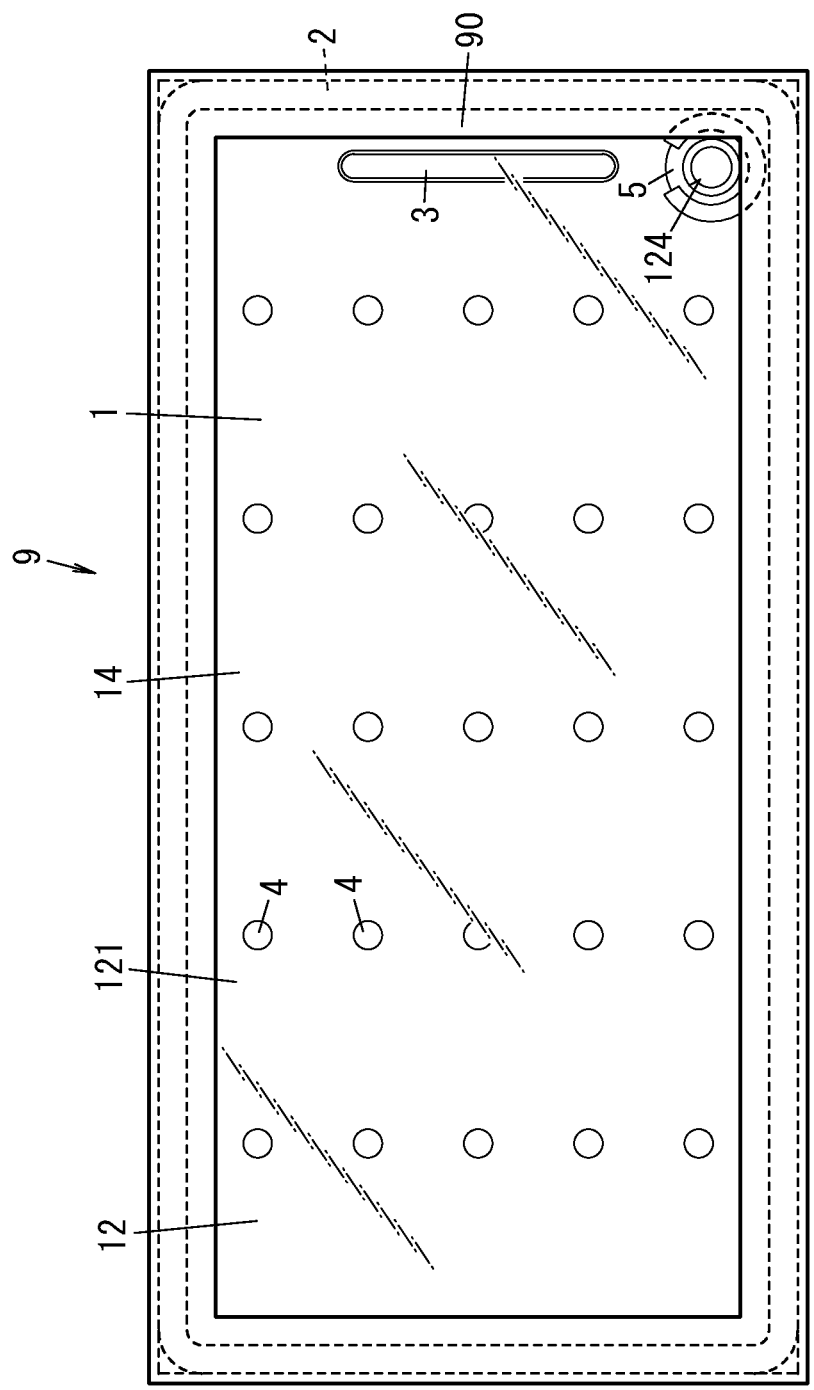
FIG. 17 is the plan view of illustrating a building component provided with the glass panel unit of the embodiment.

Next, a building component 9 including the glass panel unit 1 according to the embodiment will be described. The building component 9 shown in FIG. 17 comprises the glass panel unit 1 of the embodiment and a building component frame 90. The building component frame 90 is fitted to the glass panel unit 1, and the building component 9 is highly thermally insulating.

The building component frame 90 of the embodiment is a window frame and the building component 9 is a glass window. The building component 9 (the glass window) is used, for example, as a display window. A method for manufacturing the building component 9 includes a fitting step in addition to the steps in the method for manufacturing the glass panel unit 1 of the embodiment.

The fitting step is a step of fitting the building component frame 90 having a rectangular shape to a peripheral portion of the glass panel unit 1 manufactured through the disposition step, bonding step, evacuation and sealing step, and cooling step. The building component 9 manufactured through these steps includes the glass panel unit 1 having the inner space 14 in a reduced pressure and is thus highly thermally insulating.

(Additional Description)

The gas adsorption unit 3 in each of the embodiment and the first to sixth variations may accordingly be modified in designed.

For example, the base 311 may be formed of the same material as the protective layer 312. The base 311 in the embodiment may be the same low-melting-point glass frit as the protective layer 312.

The package 31 may be integrally formed as a whole. In this case, in the preparation step, for example, the package material 314 is applied over the entire surface of the getter 30, thereby enclosing the getter 30 in the package material 314.

Outer surfaces (outer surface of the protective layer 312 and outer surface of the base 311) of the package 31 may have a cut out formed to facilitate breakage of the package 31 in the unsealing step.

The protective layer 312 (the protective layer material 315) may be transparent or semi-transparent so that the activation status of the getter 30 can be checked based on, for example, color alteration of the getter 30. In this case, as the protective layer material 315, for example, a glass paste containing silicon dioxide, boric oxide, and zinc oxide as main components, or a glass paste containing bismuth oxide, boric oxide, and zinc oxide as main components is used.

The glass panel unit 1 in each of the embodiment and the first to sixth variation and the building component 9 including the glass panel unit 1 may accordingly be modified in design, and the configurations of the respective variations may accordingly be combined.

For example, the low-emissivity film 123 may be included in the first substrate 11 but not in the second substrate 12. In this case, the low-emissivity film 123 is stacked on one surface (specifically, a surface facing the first substrate 11) in the thickness direction of the second glass panel 121 and is located to face the internal space 14. The pressure in the internal space 14 is at least lower than the atmospheric pressure and may exceed 0.1 Pa.

The pillar 4 may be opaque. The material, dimensions, shape, arrangement pattern, and other parameters of the pillar 4 may accordingly be modified. The material, dimensions, shape, arrangement pattern, and other parameters of the sealing body 2 may accordingly be modified. The material, dimension, shape, and other parameters of the hermetically closing body 5 may accordingly be modified. The evacuation port 124 may be formed in the first substrate 11. The evacuation port 124 may be sealed by melting part of the first glass panel 111 or the second glass panel 121.

The glass panel unit 1 may include a plurality of gas adsorption units 3. In this case, the glass panel unit 1 may include a gas adsorption unit 3 including a non-metal getter and a gas adsorption unit 3 including a metal getter as the getter 30.

The package 31 may be formed of glass other than soda-lime glass, or may be made of ceramics. The package 31 may partially include glass or ceramics, and in this case, the package 31 may include metal foil or the like as a base to which the glass or the ceramics is fixed.

The melting point of the low-melting-point member 320 in each of the embodiment, the first and second variations, and the fourth to sixth variations may be higher than the melting point of the sealing material 20. In this case, the difference between the melting point of the low-melting-point member 320 and the melting point of the sealing material 20 is preferably less than or equal to 30° C. so that the heating temperature of the glass composite 10 does not become too high when the low-melting-point member 320 is melted in the bonding step. The thermal expansion coefficient of the low-melting-point member 320 in second variation may be larger than the thermal expansion coefficient of the package 31. The material for the connection member 321 is not limited to borosilicate glass but may be another glass or ceramics.

The connection member 321 in the first variation may be the second substrate 12. In a similar manner to the second variation, the connection member 321 may be omitted also in the third and fourth variations.

The building component 9 is not limited to a glass window but may be another building component such as an entrance door, a door of a room, or the like.

The method for manufacturing the gas adsorption unit 3 in each of the embodiment and the first to sixth variations may accordingly be modified in design, and the configurations of the respective variations may accordingly be combined.

For example, when the base material serving as a material for the base 311 is in the form of a paste containing glass powder and a binder, the preparation step may include a step of applying a base material to another member and drying it to form the base 311.

In the disposition step, the gas adsorption unit 3 may be disposed in the recess 113 formed in the surface 122 of the second substrate 12. In the disposition step, the surface 112 or the surface 122 on which the gas adsorption unit 3 is disposed may be a flat surface as a whole.

In the activation step, for example, the getter 30 may be activated by being heated with the complex 33 being disposed in an inert gas atmosphere.

The method for manufacturing the glass panel unit 1 and the method for manufacturing the building component 9 according to the embodiment and the first to sixth variations may accordingly be modified in design, and the configurations of the respective variations may accordingly be combined.

For example, the unsealing step in each of the embodiment and the first to sixth variations is performed after the evacuation and hermetically closing step but may be performed in the evacuation and hermetically closing step. That is, the unsealing step may be performed after the evacuation and hermetically closing step.

Alternatively, the package 31 of the gas adsorption unit 3 may be heated to a high temperature to cause thermal cracking or the like in the package 31, thereby removing sealing of the getter 30 with the package 31.

The heating temperature of the glass composite 10 in the evacuation step may be the same as the heating temperature t1 of the glass composite 10 in the bonding step.

Alternatively, forming one or a plurality of glass panel units 1 is also possible by dividing the glass panel unit 1 manufactured by the same method as the method in the embodiment. In this case, for example, a glass panel unit 1 having an internal space 14 partitioned by another sealing body is formed, and this glass panel unit 1 is then cut at a location where the another sealing body is located. This provides one or more glass panel units 1.

The non-metal getter used as the getter 30 of the fifth variation may be another zeolite exemplified in the embodiment or may be the activated carbon or the magnesium oxide exemplarily mentioned in the embodiment.

The third glass panel 131 of the sixth variation may accordingly be provided with a coating. Also, the third substrate 13 of the glass panel unit 1 of the sixth variation may face the surface 115 (see FIG. 16) of the first substrate 11 facing away from the second substrate 12. In this case, the second internal space 15 is formed between the first substrate 11 and the third substrate 13.

Alternatively, forming one or a plurality of glass panel units 1 is also possible by dividing the glass panel unit 1 manufactured by the same method as the method in the sixth variation. In this case, for example, the glass panel unit 1 is formed in which the internal space 14 is partitioned by another sealing body and the second internal space 15 is partitioned by yet another sealing body. Then, this glass panel unit 1 is cut at locations where the another sealing body and the yet another sealing body are located. This provides one or more glass panel units 1. Alternatively, the glass panel unit 1 of any one of the first to fifth variations or a glass panel unit obtained by dividing the glass panel unit 1 of any one of the first to fifth variation may be provided with a third substrate 13 in a manner similar to the sixth variation.

In the method for manufacturing the building component 9 in the embodiment, the building component frame 90 is fitted to the glass panel unit 1 formed through the disposition step, bonding step, evacuation and hermetically closing step, and the cooling step. However, the building component frame 90 may be fitted to a component obtained by dividing the glass panel unit 1 formed through these processes. Alternatively, the building component frame 90 may be fitted to the glass panel unit 1 of any one of the first to sixth variations.

(Effects)

As can be seen from the embodiment and the first to sixth variations described above, a method for manufacturing a gas adsorption unit (3) of a first aspect has the following features. The method for manufacturing the gas adsorption unit (3) includes a preparation step, an activation step, and a sealing step. The preparation step is a step of wrapping a getter (30) with a package material (314). The activation step is a step of heating the getter (30) wrapped with the package material (314) to activate the getter (30). The sealing step is a step of melting the package material (314) by heating the package material (314) so as to seal, with the package material (314), the getter (30) activated in the activation step.

According to the method for manufacturing the gas adsorption unit (3) of the first aspect, it is possible to manufacture the gas adsorption unit (3) including the getter (30) and the package (31). Here, the package (31) includes a package material (314). In the gas adsorption unit (3), the getter (30) activated is sealed with the package (31), and removing sealing of the getter (30) with the package (31) enables the getter (30) to adsorb gas. Therefore, the gas adsorption unit (3) is usable without the activation step of the getter (30). Moreover, according to the method for manufacturing the gas adsorption unit (3) of the first aspect, the getter (30) wrapped with the package material (314) is heated to activate the getter (30), and the package material (314) is heated to melt the package material (314) with the getter (30) being in an activated state in this manner, thereby easily manufacturing the gas adsorption unit (3). That is, the gas adsorption unit (3) usable without performing the activation step of the getter (30) can be easily manufactured.

As can be seen from the embodiment and the first to sixth variations, a method for manufacturing a gas adsorption unit (3) of a second aspect can be realized in combination with the first aspect. The getter (30) of the second aspect is a non-metal getter. The package material (314) contains powder (316). In the activation step, the getter (30) and the package material (314) wrapping the getter (30) are heated in an evacuated atmosphere or in an inert gas atmosphere to activate the getter (30). In the sealing step, the powder (316) is melted by heating the powder (316) with the getter (30) in an activated state so as to seal the getter (30) with the package material (314).

According to the method for manufacturing the gas adsorption unit (3) of the second aspect, it is possible to produce the gas adsorption unit (3) provided with a non-metal getter as the getter (30). In the activation step, gas generated from the getter (30) can be discharged from adjacent particles of the powder (316) of the package material (314) to the outside of the package material (314). This enables the getter 30 to be appropriately activated.

As can be seen from the embodiment and the first to sixth variations, a method for manufacturing a gas adsorption unit (3) of a third aspect can be realized in combination with the second aspect. The package material (314) of the third aspect includes a base (311) and a protective layer material (315). The protective layer material (315) contains the powder (316). The preparation step includes a first stacking step and a second stacking step. The first stacking step is a step of stacking the getter (30) on the base (311). The second stacking step is a step of stacking the protective layer material (315) on the getter (30) stacked on the base (311) to wrap the getter (30) with the base (311) and the protective layer material (315).

According to the method for manufacturing the gas adsorption unit (3) of the third aspect, it is possible to easily manufacture the gas adsorption unit (3) in which the package (31) includes the base (311) and the protective layer (312) including the protective layer material (315).

As can be seen from the embodiment and the first to sixth variations, a method for manufacturing a gas adsorption unit (3) of a fourth aspect can be realized in combination with the third aspect. In the second stacking step of the fourth aspect, the protective layer material (315) is stacked on a portion except for a peripheral portion of the base (311).

According to the method for manufacturing the gas adsorption unit (3) of the fourth aspect, when the protective layer (312) is broken in the activation step, fragments of the protective layer (312) easily hit the base (311), and the fragments of the protective layer (312) are hardly scattered.

As can be seen from the embodiment and the first to sixth variations, a method for manufacturing a glass panel unit (1) of a fifth aspect has the following configuration. The method for manufacturing the glass panel unit (1) includes: a disposition step, a bonding step, and an evacuation and hermetically closing step. The disposition step is a step of providing a first substrate (11) and a second substrate (12) to face each other with a sealing material (20) provided between the first substrate (11) and the second substrate (12) to form an internal space (14). The first substrate (11) includes a glass panel (111). The second substrate (12) includes a glass panel (121). The sealing material (20) has a frame shape. The internal space (14) is surrounded by the first substrate (11), the second substrate (12), and the sealing material (20). The bonding step is a step of heating a glass composite (10) including the first substrate (11), the second substrate (12), and the sealing material (20) to melt the sealing material (20) such that the sealing material (20) hermetically bonds the first substrate (11) and the second substrate (12) to each other. The evacuation and hermetically closing step is a step of evacuating and then sealing the internal space (14). The method for manufacturing the glass panel unit (1) includes an unsealing step. The disposition step is a step of disposing the gas adsorption unit (3) in an area surrounded by the sealing material (20) having the frame shape. The gas adsorption unit (3) is a gas adsorption unit (3) manufactured by the method of any one of the first to third aspects. The gas adsorption unit (3) includes: a package (31) formed of the package material (314); and the getter (30). In the unsealing step, thermal stress is caused at the package (31) after the evacuation and hermetically closing step to break the package (31) by the thermal stress so as to remove sealing of the getter (30) with the package (31).

In the method for manufacturing the glass panel unit (1) of the fifth aspect, the disposition step, the bonding step, and the evacuation, and hermetically sealing step are performed, thereby manufacturing a glass panel unit (1) which has an internal space (14) being sealed and which has excellent thermal insulation properties. Further, in the unsealing step, removing sealing of the getter (30) with the package (31) enables gas generated in the internal space (14) to be adsorbed on the getter (30) after the evacuation and hermetically closing step. In this case, the getter (30) activated is sealed with the package (31) until the unsealing step performed after the evacuation and hermetically closing step. Thus, the getter (30) can efficiently adsorb the gas generated in the internal space (14). In addition, activation process of the getter (30) is not required after the evacuation and hermetically closing step. Therefore, it is unnecessary to heat the glass composite (10) to a temperature equal to or higher than the activation temperature of the getter (30) after the evacuation and hermetically closing step, and it is possible to suppress the consumption of energies. That is, adopting the gas adsorption unit (3) enables the glass panel unit (1) to be easily manufactured.

As can be seen from the sixth variation, a method for manufacturing a glass panel unit (1) of a sixth aspect can be realized in combination with the fifth aspect. The method for manufacturing of the glass panel unit (1) of the sixth aspect includes a second bonding step. The second bonding step is a step of bonding a third substrate (13) to one of the first substrate (11) or the second substrate (12) with a second sealing material (134) provided between the third substrate (13) and the one of the first substrate (11) or the second substrate (12).

According to the method for manufacturing the glass panel unit (1) of the sixth aspect, it is possible to manufacture the glass panel unit (1) having the third substrate (13) and having higher thermal insulation properties.

As can be seen from the embodiment and the first to sixth variations, a method for manufacturing a building component (9) of a seventh aspect includes the following configuration. The method for manufacturing the building component (9) includes a fitting step. The fitting step is a step of fitting a building component frame (90) to the glass panel unit (1) manufactured by the method for manufacturing the glass panel unit (1) of the fifth or sixth aspect.

According to the method for manufacturing the building component 9 of the seventh aspect, it is possible to manufacture the building component (9) including the glass panel unit (1) and the building component frame (90).

REFERENCE SIGNS LIST

1 GLASS PANEL UNIT
10 GLASS COMPOSITE
11 FIRST SUBSTRATE
111 FIRST GLASS PANEL (GLASS PANEL)
112 SURFACE
12 SECOND SUBSTRATE
121 SECOND GLASS PANEL (GLASS PANEL)
13 THIRD SUBSTRATE
134 SECOND SEALING MATERIAL
14 INSIDE SPACE
20 SEALANT
3 GAS ADSORPTION UNIT
30 GETTER
31 PACKAGE
311 BASE
314 PACKAGE MATERIAL
315 PROTECTIVE LAYER MATERIAL
316 POWDERED
9 BUILDING COMPONENT
90 BUILDING COMPONENT FRAME

The invention claimed is:

1. A method for manufacturing a gas adsorption unit, the method comprising:
  a preparation step of wrapping a getter with a package material;
  an activation step of heating the getter wrapped with the package material to activate the getter; and
  a sealing step of melting the package material by heating the package material so as to seal, with the package material, the getter activated in the activation step,
  the getter being a non-metal getter,
  the package material containing powder,
  in the activation step, the getter and the package material wrapping the getter being heated in an evacuated atmosphere or an inert gas atmosphere to activate the getter,
  in the sealing step, the powder being melted by heating the powder with the getter being in an activated state so as to seal the getter with the package material.

2. The method of claim 1, wherein
the package material includes
  a base, and
  a protective layer material containing the powder, and
the preparation step includes
  a first stacking step of stacking the getter on the base, and
  a second stacking step of stacking the protective layer material on the getter stacked on the base to wrap the getter with the base and the protective layer material.

3. The method of claim 2, wherein in the second stacking step, the protective layer material is stacked on a portion except for a peripheral portion of the base.

4. A method for manufacturing a glass panel unit, the method comprising:
  a disposition step of disposing a first substrate and a second substrate to face each other with a sealing material provided between the first substrate and the second substrate to form an internal space, the first substrate including a glass panel, the second substrate including a glass panel, the sealing material having a frame shape, the internal space being surrounded by the first substrate, the second substrate, and the sealing material;

a bonding step of heating a glass composite including the first substrate, the second substrate, and the sealing material to melt the sealing material such that the sealing material hermetically bonds the first substrate and the second substrate to each other;

an evacuation and hermetically closing step of evacuating and then sealing the internal space; and an unsealing step, in the disposition step, the gas adsorption unit manufactured by the method of claim 2 being disposed in an area surrounded by the sealing material having the frame shape, the gas adsorption unit including: a package formed of the package material; and the getter, in the unsealing step, thermal stress being caused at the package after the evacuation and hermetically closing step to break the package by the thermal stress so as to remove sealing of the getter with the package.

5. The method of claim 4, further comprising a second bonding step of bonding a third substrate to one of the first substrate or the second substrate with a second sealing material provided between the third substrate and the one of the first substrate or the second substrate.

6. A method for manufacturing a building component, the method comprising a fitting step of fitting a building component frame to the glass panel unit manufactured by the method of claim 4.

7. A method for manufacturing a building component, the method comprising a fitting step of fitting a building component frame to the glass panel unit manufactured by the method of claim 5.

8. A method for manufacturing a glass panel unit, the method comprising:

a disposition step of disposing a first substrate and a second substrate to face each other with a sealing material provided between the first substrate and the second substrate to form an internal space, the first substrate including a glass panel, the second substrate including a glass panel, the sealing material having a frame shape, the internal space being surrounded by the first substrate, the second substrate, and the sealing material;

a bonding step of heating a glass composite including the first substrate, the second substrate, and the sealing material to melt the sealing material such that the sealing material hermetically bonds the first substrate and the second substrate to each other;

an evacuation and hermetically closing step of evacuating and then sealing the internal space; and an unsealing step, in the disposition step, the gas adsorption unit manufactured by the method of claim 3 being disposed in an area surrounded by the sealing material having the frame shape, the gas adsorption unit including: a package formed of the package material; and the getter, in the unsealing step, thermal stress being caused at the package after the evacuation and hermetically closing step to break the package by the thermal stress so as to remove sealing of the getter with the package.

9. The method of claim 8, further comprising a second bonding step of bonding a third substrate to one of the first substrate or the second substrate with a second sealing material provided between the third substrate and the one of the first substrate or the second substrate.

10. A method for manufacturing a building component, the method comprising a fitting step of fitting a building component frame to the glass panel unit manufactured by the method of claim 8.

11. A method for manufacturing a building component, the method comprising a fitting step of fitting a building component frame to the glass panel unit manufactured by the method of claim 9.

12. A method for manufacturing a glass panel unit, the method comprising:

a disposition step of disposing a first substrate and a second substrate to face each other with a sealing material provided between the first substrate and the second substrate to form an internal space, the first substrate including a glass panel, the second substrate including a glass panel, the sealing material having a frame shape, the internal space being surrounded by the first substrate, the second substrate, and the sealing material;

a bonding step of heating a glass composite including the first substrate, the second substrate, and the sealing material to melt the sealing material such that the sealing material hermetically bonds the first substrate and the second substrate to each other;

an evacuation and hermetically closing step of evacuating and then sealing the internal space; and an unsealing step, in the disposition step, the gas adsorption unit manufactured by the method of claim 4 being disposed in an area surrounded by the sealing material having the frame shape, the gas adsorption unit including: a package formed of the package material; and the getter, in the unsealing step, thermal stress being caused at the package after the evacuation and hermetically closing step to break the package by the thermal stress so as to remove sealing of the getter with the package.

13. The method of claim 12, further comprising a second bonding step of bonding a third substrate to one of the first substrate or the second substrate with a second sealing material provided between the third substrate and the one of the first substrate or the second substrate.

14. A method for manufacturing a building component, the method comprising a fitting step of fitting a building component frame to the glass panel unit manufactured by the method of claim 12.

15. A method for manufacturing a building component, the method comprising a fitting step of fitting a building component frame to the glass panel unit manufactured by the method of claim 7.

* * * * *